May 26, 1959
P. H. TAYLOR
2,888,257
RESILIENT AND DAMPENED PUSH PULL MEMBERS
Filed Jan. 11, 1955
2 Sheets-Sheet 1
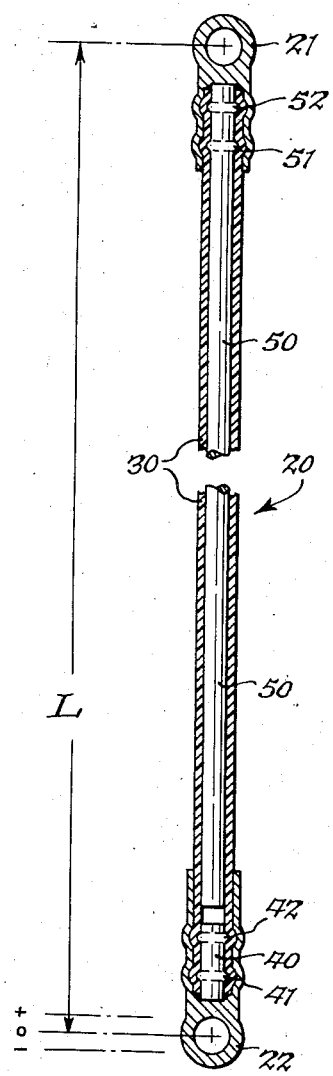
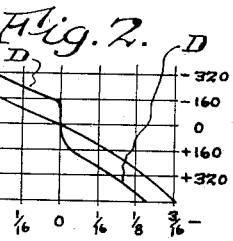
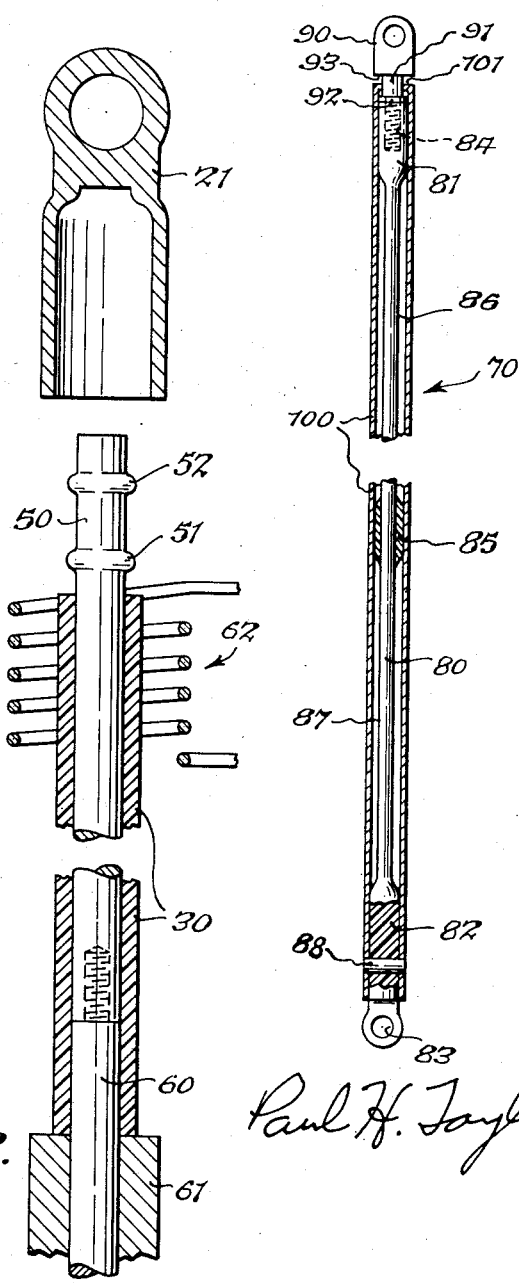

May 26, 1959
P. H. TAYLOR
2,888,257
RESILIENT AND DAMPENED PUSH PULL MEMBERS
Filed Jan. 11, 1955
2 Sheets-Sheet 2
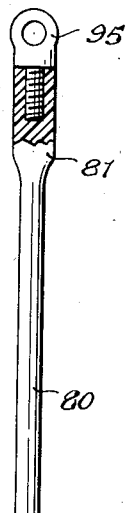
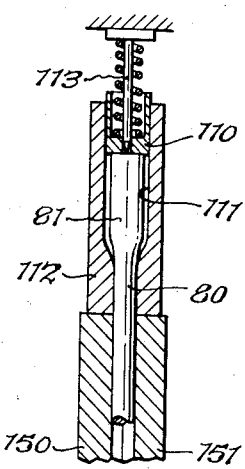
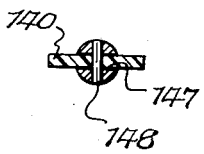
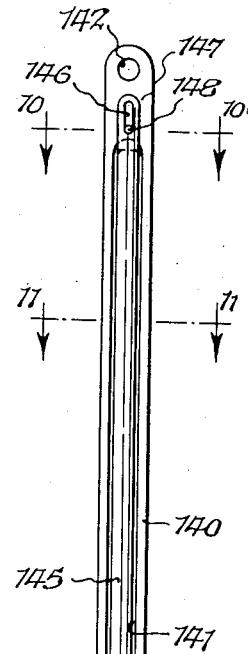
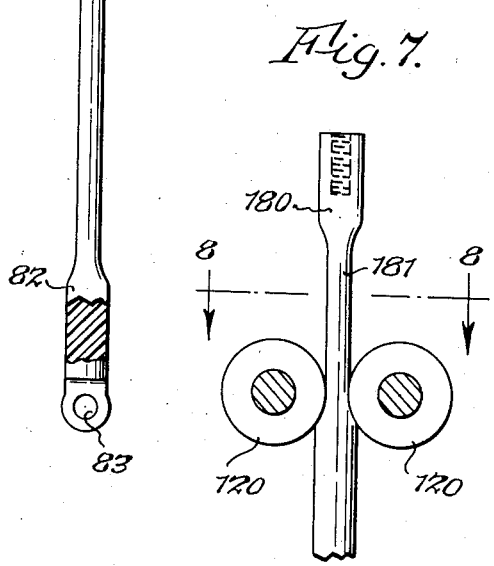
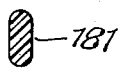

United States Patent Office 2,888,257
Patented May 26, 1959

2,888,257

RESILIENT AND DAMPENED PUSH PULL MEMBERS

Paul H. Taylor, Grand Island, N.Y.

Application January 11, 1955, Serial No. 481,062

6 Claims. (Cl. 267—1)

This invention relates to springs and more particularly to a novel resilient member also adapted to be a push-pull link with or without friction dampening and to its method of manufacture.

The efficiency of a spring material or resilience per unit volume depends upon the mechanical application of the material with respect to its resiliency. The most efficient use has been found to be stressing the material in tension or compression so that the entire cross section of the material is uniformly stressed. This efficient use of material is never applied except with respect to the elastomer rubber which, however, is non-uniform in its compression and tension, rubber being capable of only a reduction to one-third in compression but capable of an eight to ten times extension in tension. In addition its resistance increases out of proportion to its deflection so that it cannot be applied to linear force characteristics. Rubber is further difficult to stabilize and provides no structural stiffness for the material it is used with. It cannot be used as an end fitting for itself and must always be attached to some nonelastic end fitting with the ultimate failure almost always being the point of attachment to the fitting. The reason for this latter difficulty being readily understood when one considers that because of its extreme elasticity it can only be held by compressing it in the end fitting which creates an initial stress in the material and this is additive to the working stress making it the weakest section. Enlarging of end sections is sometimes resorted to but the extreme elasticity defeats this also.

A material such as steel, however, is essentially non-elastic so that to obtain a resiliency in tension a great length of steel must be used for a given deflection. In addition, the force per unit area must be high so that for light loads a very thin section is required which is obviously only good in tension. If stabilized for compression, the bulk of the stabilizing means destroys all the efficiency of the end use of the material. This can easily be understood by considering a light load and the steel member in tension to support it.

Assuming a 300 pound load and a yield stress value of 100,000 p.s.i. in the material, then for long life a design stress in the material should not exceed 30,000 p.s.i. This requires a wire .01 square inch in area or .11 inch in diameter. Assume a deflection at this stress level of .096, then a free length of wire without end fittings of 93 inches or approximately 8 feet is required. There is very little mechanical apparatus which can use such a spring. Obviously, the device is totally impractical in compression.

It will be thus obvious why conventional coil, torsion or leaf springs of steel are used in which the material is in the first two instances in torsion and in the latter in bending. In each spring the outer fibers of the material is stressed the highest, getting progressively less towards the neutral axis of the wire. Obviously, the 30,000 stress limit is the stress limit of the outer fibers. This accounts for the low resilience per unit volume for this type of spring. A coil spring provides $$\frac{S^2}{8E}$$

resilience, per unit volume a leaf spring $$\frac{S^2}{6E}$$

while a tension member provides $$\frac{S^2}{2E}$$

Thus a coil spring is only ¼ as efficient, and a leaf spring ⅓ as efficient as a straight tension member.

Considering the coil spring, for the loads noted .3 wire diameter, 1¼ inches in outside diameter with 4 active coils are required so the spring would be at least three inches long to which attachment ends would be added of at least one inch on either end. The encompassed volume would be 6.10 cubic inches. It would also be obvious that such a spring would be relatively unstable in compression. Now considering the smallest diameter spring for the given force, a spring of .25 wire diameter, ⅞ of an inch outside diameter would require 9 active coils or be at least 4 inches long plus ends of one inch length each or total of 6 inches long or 3.6 cubic inches for a 300 pound load, .096 deflection. However, this spring would fail early because of its small diameter and is not considered good design.

We will later compare this with the efficiencies of my invention.

The primary objects of this invention are to provide:
 (1) A better spring member.
 (2) A cheaper spring member.
 (3) An elastic structural member.
 (4) A spring of smaller diameter.
 (5) An elastic push-pull member.
 (6) An elastic, structural push-pull member having integral end fittings.
 (7) An elastic, structural member which cannot be duplicated by existing spring members.
 (8) An elastic, structural push-pull member which can be fabricated with a minimum of capital equipment.
 (9) A spring which can be forged at low temperatures and pressures.
 (10) A spring which can be revitalized by reheating to below its melting temperature.
 (11) Integral mechanical limit stops in a resilient member.
 (12) An elastic member which can be preloaded.
 (13) Integral friction dampening in a resilient member.
 (14) An elastic member providing essentially identical loads in tension or compression for a given deflection either side of neutral.
 (15) A method of manufacture using basic extruded stock.
 (16) A method of manufacture which is reasonable in costs.
 (17) A method of manufacture using the elements of the structure in fabrication.
 (18) A method of manufacture using simple punching processes.

These and other objects will be apparent from the following description.

Figure 1 is a side elevation, in cross section, of a typical push-pull member of unloaded length L and illustrating its tension, compression movement to either side of its unloaded length L.

Figure 2 is a graph of linear force characteristics per travel either side of neutral "L."

Figure 3 details apparatus and a method of manufacture of the member of Figure 1 using heat.

Figure 4 is a side elevation in cross section of a modification of this device using the plastic as the end fittings also.

Figure 5 illustrates a spring element of Figure 4 alone.

Figure 6 details a forging method of manufacture similar to Figure 2 but upsetting and then piercing the member ends while hot.

Figure 7 is a similar process but hot forge rolling the reduced section of a heated plastic spring member.

Figure 8 is a cross section taken as noted along line 8—8 of Figure 7.

Figure 9 shows a device such as is shown in Figures 1 and 4 but in this instance it is blanked out of strip stock.

Figure 10 is taken along line 10—10 of Figure 9.

Figure 11 is taken as noted along line 11—11 of Figure 9.

Figure 1 illustrates a resilient push-pull element 20 having pin eye fittings 21 and 22 so that it may be coupled to a mechanical device as a link. Obviously, other end fittings can be used. Member 20 has a tubular plastic member 30 which is preferably of nylon formulation 10001 although other like structural plastic materials such as, for instance, Kel–F., Teflon or other nylon grades may also be used. These materials are characterized by good structural strength of around 15,000 p.s.i. yet possessing some elasticity. They fall midway between the rubbers and the metals in this respect. My invention contemplates their use as an elastic, bearing, dampening and structural member in devices requiring resilient push-pull links. In this arrangement a nonelastic core member 40 and 50 may be used to secure the rod ends 22, 21 and act as internal stops when they abut as from an overload in compression. However, in many instances two short members 40 could be used which would have the tube 30 open except for the end fittings 21, 22 and their internal supports 40. Core members 40 and 50 support the nylon tube 30 against collapse particularly at the beads 41, 42 and 51, 52, respectively, which fastens the tube 30 to fittings 21, 22. Member 20 has an unloaded length L but upon approximate equal loads in compression or tension the member 20 moves to the + line or − line, respectively, providing a $3/16$ stroke with a 320 pound force as is shown in Fig. 2. Thus, a resilient link is provided which will transmit push-pull elastically. A compression load exceeding 320 pounds causes member 40 and 50 to abut and provide a nonyielding member for forces exceeding 320 pounds, member 50 is preferably about 1% smaller in area than the inside of tube 30 but if friction dampening is desired, local or continuous interference between member 30 and 50 can be used. A curve D of Figure 2 could then be provided for friction dampening or absorption of energy. Figure 2 also illustrates the substantially linear characteristics of elasticity of this member. Also by placing a local interference part way down the plastic or nonresilient member so that free resiliency up to this point is available, a resilient movement is possible to a degree followed by a resilient and damped movement. This will be described in detail in discussions of Figure 3. There are other push-pull link applications in which a nonelastic push should be transmitted with an elastic yielding in tension. By abutting members 40 and 50 at the 0 point nonelastic compression with elastic tension can be provided. If members 50 and 40 are longer than the inside of tube 30 so that it must be initially stretched, a given preload in tension with nonyielding compression can be easily produced for the push-pull element 20.

Considering a specific member constructed according to Fig. 1 for the loads described in connection with the coil springs or tension steel member of the introduction. Assume a 300 pound resilient force and a $3/32$ stroke either side of neutral a plastic member having a $1/4$ inch bore and a $13/32$ O.D. 10 inches long will serve with a $1/4$ rod therethrough, such a unit with ends has a displaced volume of only 1.350 cubic inches compared with 3.6 cubic inches for the coil spring. Since it weighs only slightly more than a steel push-pull member and yet is resilient and structural at low cost it is obvious that such a device has wide application in the machine tool, aircraft and ordnance fields.

In Figure 3 I illustrate how parts of the structure are used in the manufacture of the device. First, member 50 is inserted through member 30, then tension member 60 is threadedly attached to member 50 with member 30 bearing on stop 61 of the apparatus. Rod end 21 is then lowered over the assembly and induction coil 62 is energized. The metallic ends are heated and through conduction and radiation, heat plastic member 30 locally up to a temperature of 50° below its melting point or, say, 300° F.–325° F. At this point member 50 is drawn into tube 30 causing the tube 30 to elastically flow around ridges 51 and 52 to key member 30 and 21 thereby. Member 21 is then swedged inwardly to cause it to conform to the outside of member 30 as shaped by member 52. A similar operation except pushing end 40 into tube 30 and then swedging rod end 22 thereon completes the fabrication of member 30. Assembly can also be completed by heating member 50, 30 and 21, say, in hot oil and then causing the deformation of member 30.

Figure 4 illustrates another version of my spring 70 in which a plastic member 80 is used having enlarged ends 81 and 82 for the structural attachments. End 82 is enlarged and flattened with a hole 83 formed therein to be one attachment of the member. The end 81 has a threaded bore 84 therein in which an end fitting 90 is threadedly engaged. A tubular metallic element 100 surrounds plastic member 80 and has a spun in end portion 101 which engages necked down portion 91 of member 90 formed between end washer 92 and end face 93 of fitting 90. A pin 88 may be used to secure end 82 to tube 100. Thus member 70 provides a push-pull member 70 similar to Figure 1 but with stop member 101 providing terminal stops after or before elastic movement in either direction as can be arranged and is discussed hereinafter, whereas in the device of Figure 1 compression stops only are provided. A nylon friction section 85 may be machined in member 80 or may be cemented thereon as an additive split piece as is shown herein. Member 85 may be so located that free section 86 permits resilient movement up to the friction load of member 85 against tube 100 after which section 87 comes into operation as a dampening medium. Free elastic movement is proportional to the positioning of member 85 depending upon the circumstances. On an extremely long member 80 a nonfriction guide member 85 or a plurality of them or the device 181 might be necessary to prevent bending of member 80 in compression loads. On a non-axial sudden acceleration applied to assembly 70 these guide members 85 or 181 would prevent elastic member 80 from whipping violently from its own inertia.

To obtain preloads in compression or tension the length of tube 100 is determined to provide an abutting relationship with washer 92 or end face 93, respectively. In this manner member 80 can be intially compressed and held compressed to any degree of precompression. Tension can be likewise preloaded into member 70.

In Figure 5 I illustrate the nylon member 80 as it may be used if short, for elastic push-pull movement without mechanical stops or dampening. There are many applications for such a resilient member for low or no push compression forces and large tension forces. For instance, if the member of Figure 4 was, say, 6 inches long and $3/8$ inch in diameter, at the reduced section, compression loads of 100 pounds could be transmitted with an elastic movement of, say, $1/32$ inch at this load and tension loads of 300 pounds at a $3/32$ stroke. It will be noted that member 80 has a metallic pin eye 95 threadedly engaged therewith. Obviously nylon rod ends 82 can be fabricated on both ends if the apparatus so permits.

In Figure 6 is illustrated a method by which the ends can be simultaneously enlarged and perforated. Plastic rod 80 is heated to just below its melting point, for instance 320° or 325° F. for nylon 10001 and then caused to be subject to pressure from a spring loaded plunger 110. The die apparatus consists of a secured split die member 112 and a secured split support member 150, 151. The enlargement of end 81 of member 80 is shown partially completed. When end 81 completely fills the cavity the continued pressure causes a hot forging of the end 81. I have found subjecting the plastic to heat and pressure below the critical temperature without too much dimensional change actually strengthens the material, improving its fatigue resistance. The die and the plastic can be heated but if a cold die is used the operation must be done quickly on the hot plastic and a secondary heating operation for stress relieving may be desirable. After end 81 of member 80 is enlarged and the material fills the cavity 111 of die member 112 piercing plunger 113 puts the bore for thread 84 therein, raising the forging pressures higher. Member 80 is then withdrawn from die 112. The other end may be also hot upset to the required shape in a like manner in a hot die or with the end of member 80 heated first to form end 82.

Figure 7 illustrates another method of getting a similar plastic part 180 in which the center or reduced section 181 is formed to the cross section shown in Figure 8 by means of preferably heated rollers 120 operating against the heated plastic. Since the primary object is to provide a reduced section 181 for elastic distortion but with large ends which will be substantially nondeforming for bearing, threaded or other attachment it will be obvious that this method can also be employed. With deformation taking place over several rolling operations on the hot plastic increased resiliency and fatigue resistance can be imparted thereby, to the oblong section 181 shown in Figure 8.

Figure 9 illustrates an alternate method in which strip stock is used to provide the resilient element 140 and an oblong hole 141 is blanked out of member 140 and a bore 142 is punched in each end for attachment thereto. A metallic bar 145 is provided as shown in Fig. 11 with fork ends 147 shown also in Fig. 10 for permitting movement of member 140 at slotted fork end 146 while stabilizing it and providing means for transmitting nonelastic tension or compression after the desired design resiliency of the unit has been exceeded. As is shown in Figure 9 the assembly is designed for nonelastic compression as pin 148 abuts the slot 146 in the compression direction and the other forked extremity 147 is pinned as at 148. Thus on compression the unit operates as a solid push member but on tension slip joint 146, 148 comes into play until its terminal travel after which the assembly again operates as a solid nonelastic link but in tension.

Yielding compression forces can be taken by providing free play in the compression direction by slip joint 146, 148. However, sides 141 will deflect rather than compress so that compression forces would be low.

A yielding member of various configurations is disclosed by which push-pull forces of a direct, yielding or preloaded yielding can be provided. Terminal stops in either direction with nonyielding transmittal thereafter is also shown. Such a member can be used as a push-pull rod for mechanical apparatus replacing present springs and push or pull rods, for instance in an overhead valve configuration as the push rod and valve spring; as a push-pull or straight tension member for avoiding the tolerance stretch in the conjugate cam arrangement of the textile loom; as a spring for a vehicle; as a push-pull link and spring for a vehicle door latch lock, etc.

Such a member fabricated out of other plastics having yieldable cold flow, as for instance Teflon, Kel–F. or nylon formulation 7001, 6503 can be adapted to automatically size themselves while providing a push-pull or yielding member.

Another feature not previously discussed is the phenomenal resilient life of such a spring. I have tested a nylon 10001 link several million cycles without fatigue. In addition reheating to the critical temperature of forming noted hereinbefore revives the material for further extended life It will be obvious that the invention described herein is capable of various modifications and applications without departing from the scope of what is claimed and decribed herein.

I claim:

1. A push-pull member comprising a yieldable high strength structural plastic member, a pair of enlarged structural engaging sections on said member, a pair of end attachments associated therewith for transmitting axial loads to said member, a nonplastic structural nondeflecting member along the axis of said plastic member fastened rigidly to one of said end attachments and in slip joint association with elements of the other end attachment to accommodate limited resilient axial deflection of said member, said non-deflecting member engaging said other end attachment upon overload to prevent further deflection of said member.

2. A push-pull member comprising a yieldable high strength structural plastic member, a pair of enlarged structural engaging sections on said member, a pair of end attachments associated therewith for transmitting axial loads to said member, a nonplastic structural non-deflecting member along the axis of said plastic member fastened rigidly to one of said end attachments and in slip joint association with elements of the other end attachment and in frictional dampened engagement with said plastic member between said slip joint and said position of rigid attachment to accommodate limited resilient axial deflection of said member, said non-deflecting member engaging said other end attachment upon overload to prevent further deflection of said member, and said frictional dampened engagement providing a low load range of limited undampened axial deflection and a higher load range of limited damped axial deflection of said member.

3. A push-pull member comprising a yieldable high strength structural plastic member, a pair of enlarged structural engaging sections on said member, a pair of end attachments associated therewith, a nonplastic structural non deflecting member along the axis of said plastic member fastened rigidly to one of said end attachments and in slip joint association with elements of the other end attachment and in frictional damped interference with said plastic member therebetween to accommodate limited resilient axial deflection of said member and providing frictionally damped travel throughout said deflection, said nondeflecting member engaging said other end attachment on overload to prevent further deflection of said member.

4. A push-pull member comprising a resilient high strength structural plastic tubing member, a pair of internal core members fastened to each end of said tubing and collectively extending substantially the entire length of said tubular member but providing a limited gap between the members whereby upon the application of limited axial force said plastic member is resiliently deflected in direct proportion to the forces applied thereto but upon excessive force said internal core members abut transmitting a relatively nonyielding force.

5. A push-pull member comprising a resilient high strength structural plastic member, said plastic member being of different areas with a reduced area adapted to yielding and larger area sections adapted to structural attachments, a separable fitting attached to one enlarged section of said plastic member, a relatively nonresilient tubular member attached rigidly to another enlarged section of said plastic member and in slip joint association with said fitting to accommodate limited resilient axial deflection of said member in response to axial loads applied to said fitting said said tubular member, said nonresilient tubular member engaging said fitting upon overload to prevent further deflection of said plastic member.

6. A push-pull member comprising a strip of resilient high strength structural plastic, a central section removed therefrom, and a pair of end attachment means formed in each end, a relatively nonresilient member disposed in the removed central section of said plastic member, and means securing the ends of said nonresilient member to the end portions of said plastic member to provide limited resilient axial deflection of said plastic member in response to axial loads up to a given maximum load and to rigidly connect the ends of said nonresilient member to the end portions of said plastic member when axial loads in excess of said maximum axial load are applied to transmit the loads directly to said nonresilient member.

References Cited in the file of this patent

UNITED STATES PATENTS

| | | |
|---|---|---|
| 1,594,962 | Jacobs | Aug. 3, 1926 |
| 1,599,353 | Albin | Sept. 7, 1926 |
| 1,834,502 | Smith | Dec. 1, 1931 |
| 2,059,867 | Hinds | Nov. 3, 1936 |
| 2,085,320 | Kolstrand | June 29, 1937 |
| 2,291,670 | Wiley et al. | Aug. 4, 1942 |
| 2,338,524 | McCabe | Jan. 4, 1944 |
| 2,465,621 | Wheeler | Mar. 29, 1949 |
| 2,689,464 | Wurtz | Sept. 21, 1954 |

OTHER REFERENCES

Machine Design, volume 22, Issue No. 4, page 17, April 1950.

Electronics, March 1952, page 225.

UNITED STATES PATENT OFFICE
CERTIFICATE OF CORRECTION

Patent No. 2,888,257                                            May 26, 1959

Paul H. Taylor

It is hereby certified that error appears in the printed specification of the above numbered patent requiring correction and that the said Letters Patent should read as corrected below.

Column 3, line 38, for "have" read -- leave --; column 7, line 4, for "said", second occurrence, read -- and --.

Signed and sealed this 17th day of November 1959.

(SEAL)
Attest:

KARL H. AXLINE
Attesting Officer

ROBERT C. WATSON
Commissioner of Patents